US012657385B2

(12) United States Patent
Watanabe-Inui et al.

(10) Patent No.: US 12,657,385 B2
(45) Date of Patent: Jun. 16, 2026

(54) INFORMATION PROCESSING APPARATUS, INFORMATION PROCESSING METHOD, AND PROGRAM

(71) Applicant: LEGALON TECHNOLOGIES, INC., Tokyo (JP)

(72) Inventors: Emiko Watanabe-Inui, Tokyo (JP); Yuya Watanabe, Tokyo (JP)

(73) Assignee: LegalOn Technologies, Inc., Tokyo (JP)

( * ) Notice: Subject to any disclaimer, the term of this patent is extended or adjusted under 35 U.S.C. 154(b) by 171 days.

(21) Appl. No.: 18/400,909

(22) Filed: Dec. 29, 2023

(65) Prior Publication Data

US 2024/0135100 A1    Apr. 25, 2024
US 2024/0232529 A9    Jul. 11, 2024

Related U.S. Application Data

(63) Continuation of application No. PCT/JP2022/023738, filed on Jun. 14, 2022.

(30) Foreign Application Priority Data

Jul. 2, 2021    (JP) ................................. 2021-110715

(51) Int. Cl.
G06F 40/253    (2020.01)
G06F 40/30    (2020.01)
(52) U.S. Cl.
CPC ............ G06F 40/253 (2020.01); G06F 40/30 (2020.01)

(58) Field of Classification Search
None
See application file for complete search history.

(56) References Cited

U.S. PATENT DOCUMENTS

2002/0002547 A1    1/2002    Takayuki et al.
2021/0034816 A1*    2/2021    Lall ........................ G06F 16/284

FOREIGN PATENT DOCUMENTS

| JP | H05-189430 A | 7/1993 |
|----|----|----|
| JP | H11-161682 A | 6/1999 |
| JP | 2011-118861 A | 6/2011 |
| JP | 2011-186812 A | 9/2011 |

OTHER PUBLICATIONS

International Search Report directed to related International Patent Application No. PCT/JP2022/023738, mailed Aug. 2, 2022, with attached English-language translation; 4 pages.

* cited by examiner

*Primary Examiner* — Antim G Shah
(74) *Attorney, Agent, or Firm* — Sterne, Kessler, Goldstein & Fox P.L.L.C.

(57) ABSTRACT

An information processing apparatus includes: an acquiring unit which acquires document information related to a document; a discriminating unit which discriminates a term included in the document as a defined term that is defined as a term with a specific meaning based on a first rule; a confirming unit which confirms a usage condition of the discriminated defined term in the document based on a second rule; and an output information generating unit which generates output information for outputting a confirmation result of the usage condition.

15 Claims, 13 Drawing Sheets

Figure 2:
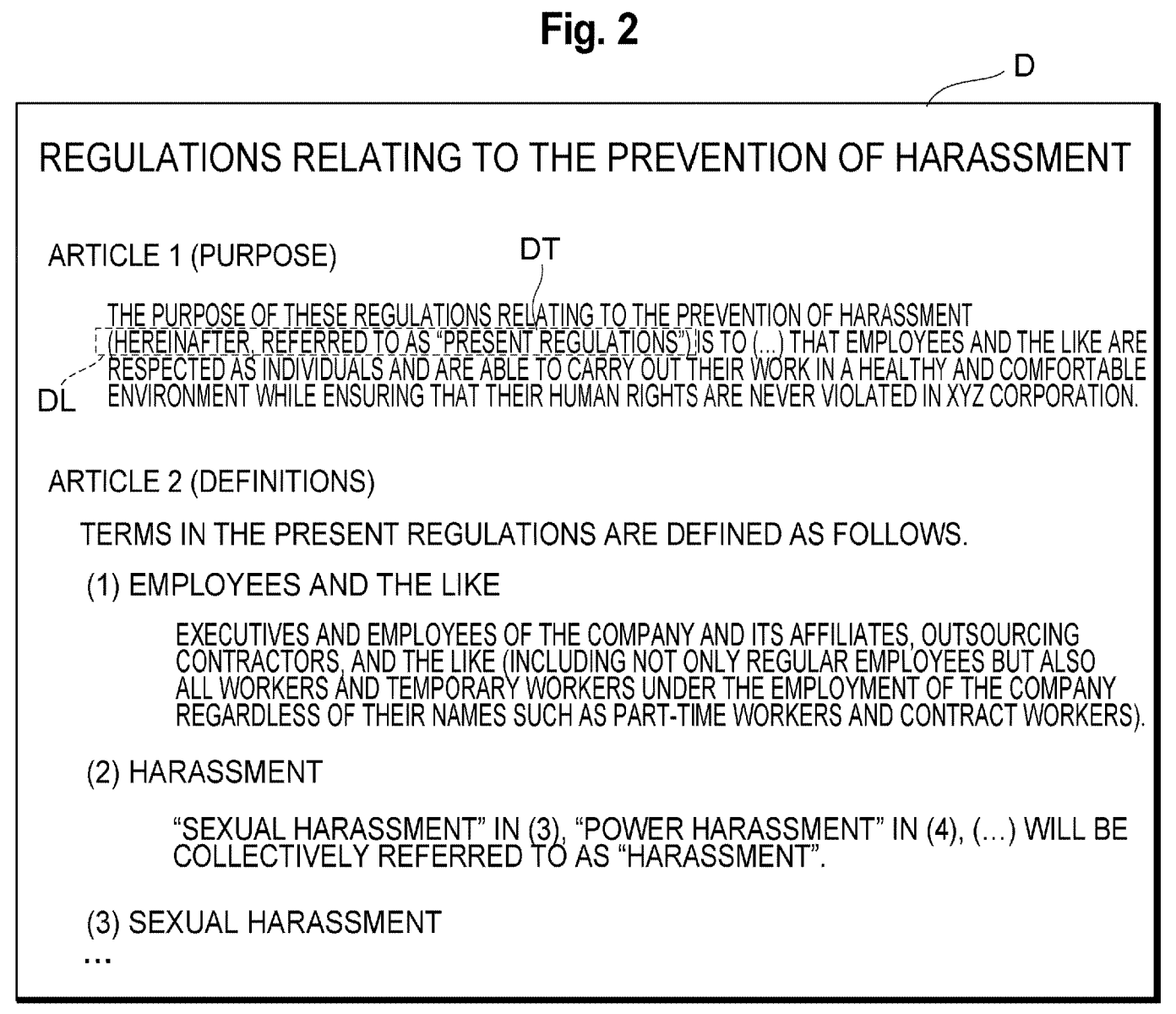

REGULATIONS RELATING TO THE PREVENTION OF HARASSMENT

ARTICLE 1 (PURPOSE)  DT

DL  THE PURPOSE OF THESE REGULATIONS RELATING TO THE PREVENTION OF HARASSMENT (HEREINAFTER REFERRED TO AS "PRESENT REGULATIONS") IS TO (...) THAT EMPLOYEES AND THE LIKE ARE RESPECTED AS INDIVIDUALS AND ARE ABLE TO CARRY OUT THEIR WORK IN A HEALTHY AND COMFORTABLE ENVIRONMENT WHILE ENSURING THAT THEIR HUMAN RIGHTS ARE NEVER VIOLATED IN XYZ CORPORATION.

ARTICLE 2 (DEFINITIONS)

TERMS IN THE PRESENT REGULATIONS ARE DEFINED AS FOLLOWS.

(1) EMPLOYEES AND THE LIKE

EXECUTIVES AND EMPLOYEES OF THE COMPANY AND ITS AFFILIATES, OUTSOURCING CONTRACTORS, AND THE LIKE (INCLUDING NOT ONLY REGULAR EMPLOYEES BUT ALSO ALL WORKERS AND TEMPORARY WORKERS UNDER THE EMPLOYMENT OF THE COMPANY REGARDLESS OF THEIR NAMES SUCH AS PART-TIME WORKERS AND CONTRACT WORKERS).

(2) HARASSMENT

"SEXUAL HARASSMENT" IN (3), "POWER HARASSMENT" IN (4), (...) WILL BE COLLECTIVELY REFERRED TO AS "HARASSMENT".

(3) SEXUAL HARASSMENT

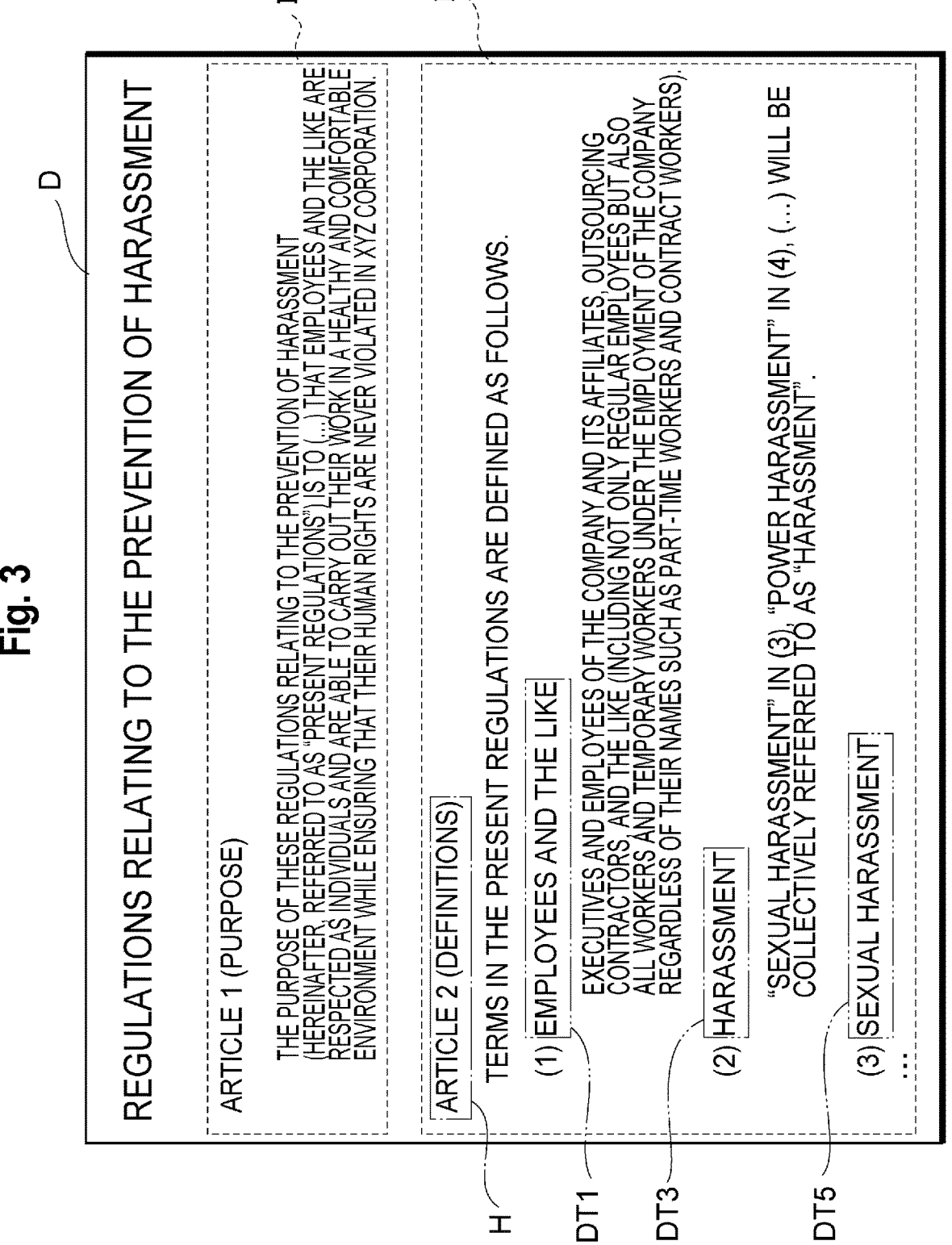

REGULATIONS RELATING TO THE PREVENTION OF HARASSMENT

ARTICLE 1 (PURPOSE)

THE PURPOSE OF THESE REGULATIONS RELATING TO THE PREVENTION OF HARASSMENT (HEREINAFTER REFERRED TO AS "PRESENT REGULATIONS") IS TO (...) THAT EMPLOYEES AND THE LIKE ARE RESPECTED AS INDIVIDUALS AND ARE ABLE TO CARRY OUT THEIR WORK IN A HEALTHY AND COMFORTABLE ENVIRONMENT WHILE ENSURING THAT THEIR HUMAN RIGHTS ARE NEVER VIOLATED IN XYZ CORPORATION.

ARTICLE 2 (DEFINITIONS)

TERMS IN THE PRESENT REGULATIONS ARE DEFINED AS FOLLOWS.

(1) EMPLOYEES AND THE LIKE

EXECUTIVES AND EMPLOYEES OF THE COMPANY AND ITS AFFILIATES, OUTSOURCING CONTRACTORS, AND THE LIKE (INCLUDING NOT ONLY REGULAR EMPLOYEES BUT ALSO ALL WORKERS AND TEMPORARY WORKERS UNDER THE EMPLOYMENT OF THE COMPANY REGARDLESS OF THEIR NAMES SUCH AS PART-TIME WORKERS AND CONTRACT WORKERS).

(2) HARASSMENT

"SEXUAL HARASSMENT" IN (3), "POWER HARASSMENT" IN (4), (...) WILL BE COLLECTIVELY REFERRED TO AS "HARASSMENT".

(3) SEXUAL HARASSMENT

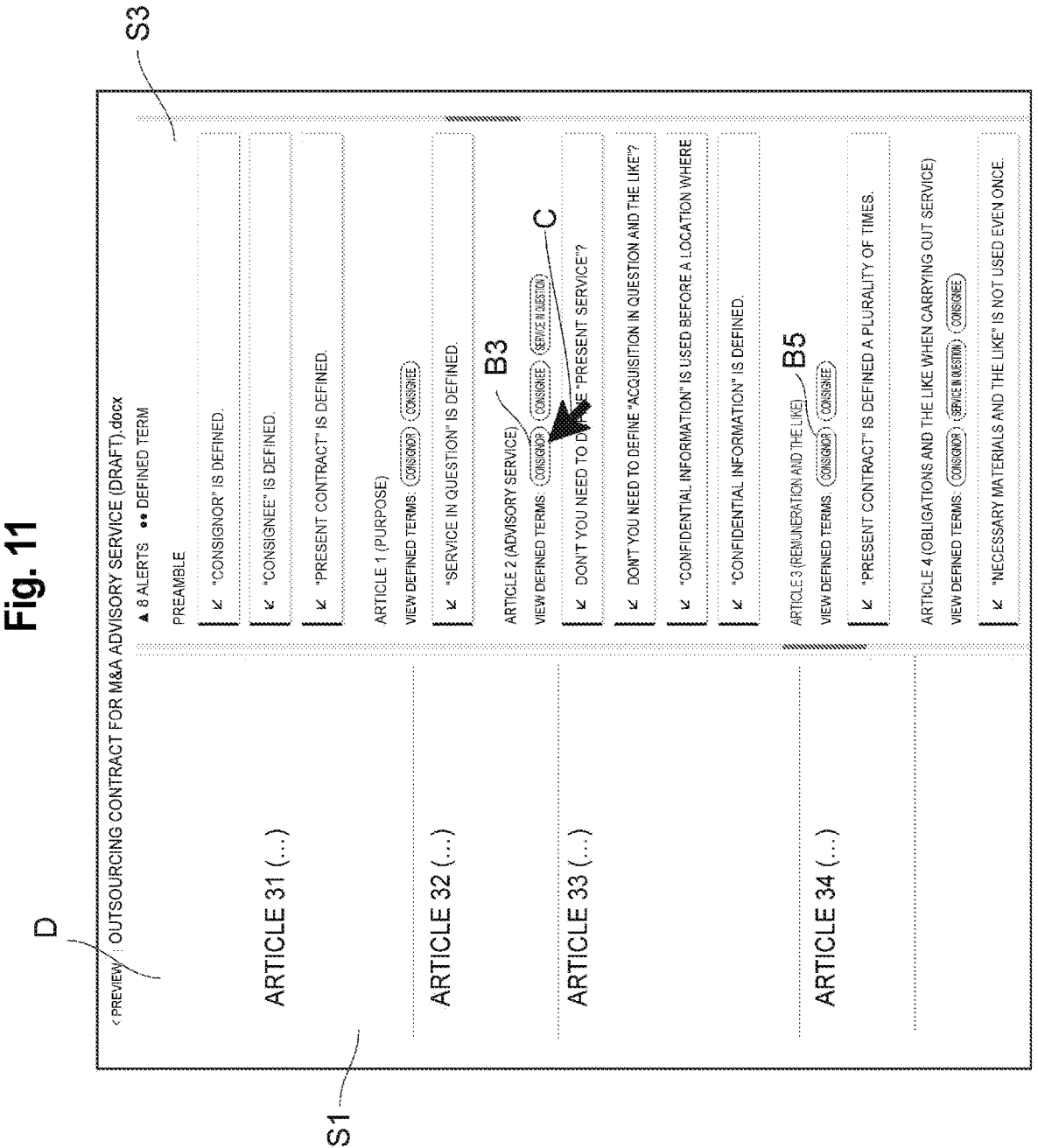

< PREVIEW : OUTSOURCING CONTRACT FOR M&A ADVISORY SERVICE (DRAFT).docx

▲ 8 ALERTS    •• DEFINED TERM

PREAMBLE

↙ "CONSIGNOR" IS DEFINED.

↙ "CONSIGNEE" IS DEFINED.

↙ "PRESENT CONTRACT" IS DEFINED.

ARTICLE 1 (PURPOSE)

VIEW DEFINED TERMS: ( CONSIGNOR ) ( CONSIGNEE )

↙ "SERVICE IN QUESTION" IS DEFINED.

ARTICLE 2 (ADVISORY SERVICE)

VIEW DEFINED TERMS: ( CONSIGNOR ) ( CONSIGNEE ) ( SERVICE IN QUESTION )    B3

↙ DON'T YOU NEED TO DEFINE "PRESENT SERVICE"?

↙ DON'T YOU NEED TO DEFINE "ACQUISITION IN QUESTION AND THE LIKE"?

↙ "CONFIDENTIAL INFORMATION" IS USED BEFORE A LOCATION WHERE

↙ "CONFIDENTIAL INFORMATION" IS DEFINED.

ARTICLE 3 (REMUNERATION AND THE LIKE)    B5

VIEW DEFINED TERMS: ( CONSIGNOR ) ( CONSIGNEE )

↙ "PRESENT CONTRACT" IS DEFINED A PLURALITY OF TIMES.

ARTICLE 4 (OBLIGATIONS AND THE LIKE WHEN CARRYING OUT SERVICE)

VIEW DEFINED TERMS: ( CONSIGNOR ) ( SERVICE IN QUESTION ) ( CONSIGNEE )

↙ "NECESSARY MATERIALS AND THE LIKE" IS NOT USED EVEN ONCE.

ARTICLE 31 (...)

ARTICLE 32 (...)

ARTICLE 33 (...)

ARTICLE 34 (...)

S3

S1

D

C

INFORMATION PROCESSING APPARATUS, INFORMATION PROCESSING METHOD, AND PROGRAM

This application is a continuation application based on international Application No. PCT/JP2022/23738 filed on Jun. 14, 2022, which claims priority to Japanese Patent Application No. 2021-110715 filed on Jul. 2, 2021, the entire contents of which are incorporated herein by reference.

TECHNICAL FIELD

The present discloser relates to an information processing apparatus, an information processing method, and a program.

BACKGROUND ART

In a document such as a contract, consistency of terminology described in the document may be highly desired.

For example, Patent Document 1 describes a document check apparatus for checking consistency of description in a document to be analyzed. When a specific character string (for example, "said" or "concerned") is used in a document in order to indicate that a term following the character string has already appeared in the document, the document check apparatus can check consistency of use of such a specific character string.

CITATION LIST

Patent Document

Patent Document 1: Patent Publication JP-A-2011-118861

SUMMARY

An information processing apparatus according to an aspect of the present embodiment includes: an acquiring unit which acquires document information related to a document; a discriminating unit which discriminates a term included in the document as a defined term that is defined as a term with a specific meaning based on a first rule; a confirming unit which confirms a usage condition of the discriminated defined term in the document based on a second rule; and an output information generating unit which generates output information for outputting a confirmation result of the usage condition.

BRIEF DESCRIPTION OF DRAWINGS

FIG. 1 is a diagram showing an example of functional blocks of a defined term discriminating apparatus according to an embodiment.

FIG. 2 is a conceptual diagram showing an example of defined term discrimination processing according to an embodiment.

FIG. 3 is a conceptual diagram showing another example of defined term discrimination processing according to an embodiment.

FIG. 11 is a diagram showing an output example of a confirmation result of a usage condition of a defined term according to an embodiment.

DESCRIPTION

Figure 4:
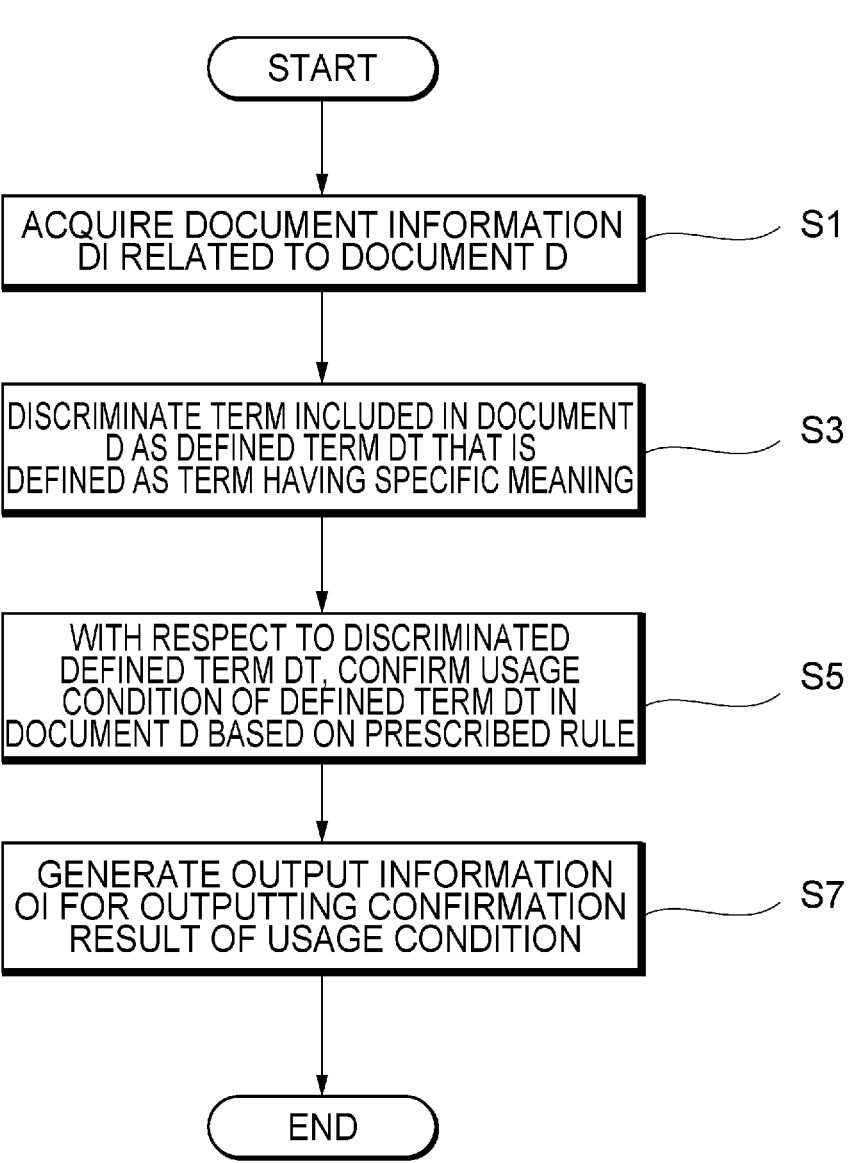
FIG. 4 is a flow chart showing an example of output information generation processing for generating output information for outputting a confirmation result of a usage condition of a defined term according to an embodiment.

Hereinafter, embodiments of the present disclosure will be described with reference to the accompanying drawings. The embodiments described below are for illustrative purposes only and are not intended to limit the present invention thereto. In addition, various modifications can be made to the present invention without departing from the scope of the invention. A same component among the respective drawings will be denoted by a same reference sign whenever possible and redundant descriptions will be omitted.

Figure 1:
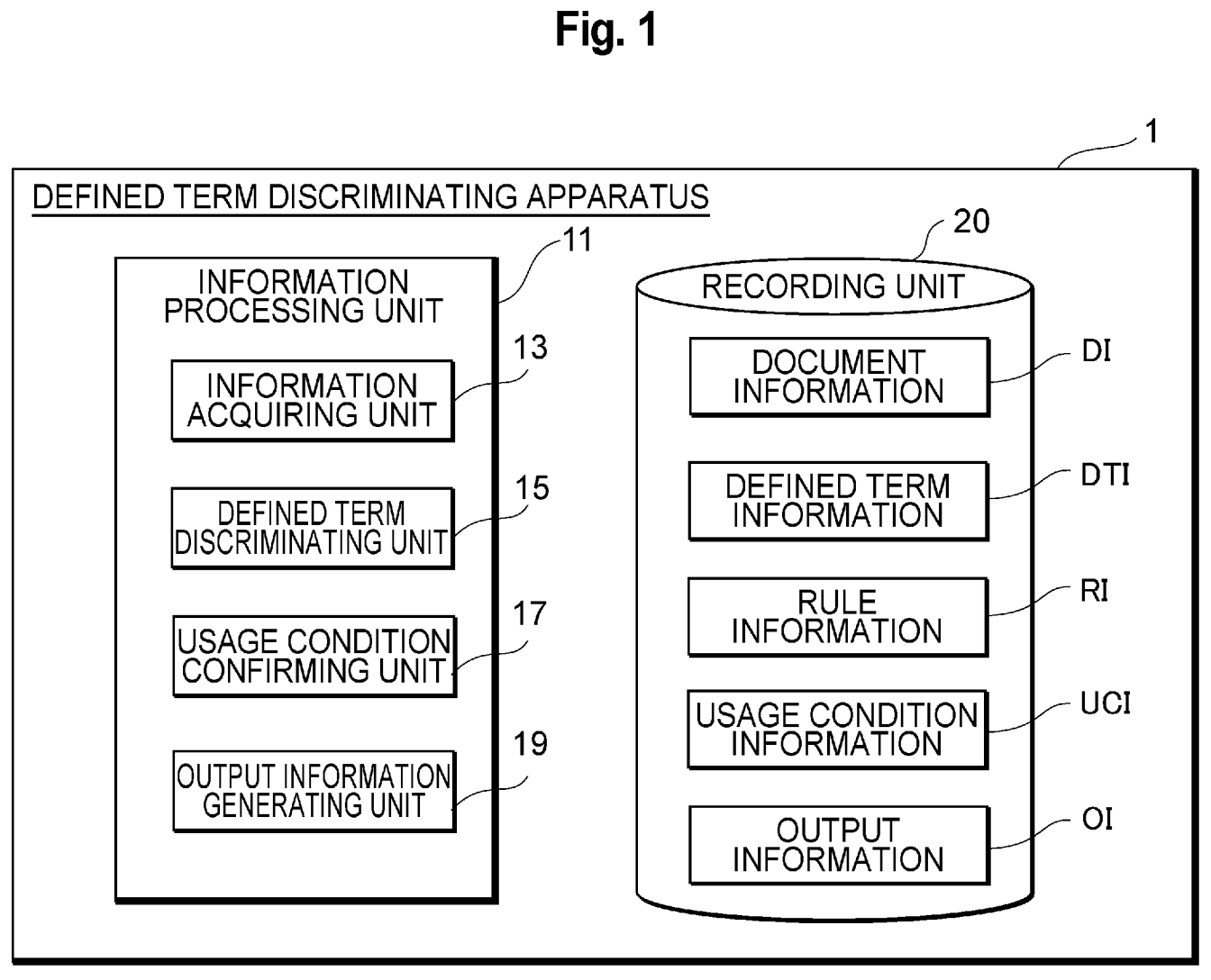

FIG. 1 is a diagram showing an example of functional blocks of a defined term discriminating apparatus 1 according to an embodiment. The defined term discriminating apparatus 1 may be an apparatus for discriminating a defined term from a plurality of arbitrary terms in a document, confirming a usage condition of the discriminated defined term in the document, and presenting a user with a confirmation result. For example, the defined term discriminating apparatus 1 is realized by a desktop computer, a laptop computer, a smartphone, or the like. For example, the defined term discriminating apparatus 1 may be realized by one or a plurality of server apparatuses.

In a conventional document check apparatus such as that described above, a term to which a prefix such as "said" has been added can be extracted from a document and consistency of the term to which the prefix has been added can be checked. However, it may be not easy to discriminate a defined term that is defined as a term with a specific meaning from arbitrary terms in a document and subsequently check a usage condition of the defined term.

Several aspects of the present embodiment have been made in consideration of such circumstances and an object of the present embodiment is to provide an information processing technique that enables a usage condition of a defined term in a document to be readily confirmed.

Illustratively, the defined term discriminating apparatus 1 may include an information processing unit 11 which executes information processing for discriminating a defined term from a plurality of arbitrary terms in a document and a recording unit 20 which records information for executing the information processing and information generated by executing the information processing.

Functionally, the information processing unit 11 may include an information acquiring unit 13 (acquiring unit), a defined term discriminating unit 15 (discriminating unit), a usage condition confirming unit 17 (confirming unit), and an output information generating unit 19 (generating unit). Each unit described above of the information processing unit 11 can be realized by, for example, using a storage area of a memory, a hard disk, or the like or having a processor execute a program stored in the storage area.

The information acquiring unit 13 may acquire document information DI related to a document. For example, the information acquiring unit 13 may acquire document information DI recorded in advance in the recording unit 20 (an internal database). The information acquiring unit 13 may acquire document information DI from a database outside of the defined term discriminating apparatus 1.

The defined term discriminating unit 15 may discriminate a term included in the document as a defined term that is defined as a term having a specific meaning based on a first rule. The "first rule" may refer to a prescribed rule for discriminating a defined term from a plurality of arbitrary terms included in the document. Specific examples of the first rule will be described later with reference to FIGS. 2 and 3. For example, when extracting a plurality of terms being a discrimination object of a defined term from a document, the defined term discriminating unit 15 may read character information in the document, perform a morphological analysis, and segments each term.

A "morphological analysis" may be one type of natural language processing performed by a computer. A "morphological analysis" may refer to analytical processing of segmenting text data of a natural language not annotated by grammatical information into units of morphemes based in information such as grammar of an object language and parts of speech of terms and discriminating a part of speech or the like for each morpheme. The defined term discriminating unit 15 may execute dependency parsing (syntactic parsing) or, in other words, investigate a modification relation in a sentence from part of speech information. The defined term discriminating unit 15 can refer to dictionary databases such as a corpus dictionary when executing a morphological analysis. The dictionary databases may be stored in, for example, the recording unit 20 in the defined term discriminating apparatus 1 or stored in a prescribed server apparatus outside of the defined term discriminating apparatus 1.

FIG. 2 is a conceptual diagram showing an example of defined term discrimination processing based on the first rule according to an embodiment. When a term in a document D is expressed in a specific format, the defined term discriminating unit 15 may discriminate the term as a defined term. For example, when the term is expressed in a specific format that reads "hereinafter, referred to as "???"" such as "hereinafter, referred to as "present regulations"" inside a dashed-line frame DL, the defined term discriminating unit 15 may discriminate the term "present regulations" as a defined term DT. The specific format may need only enable the defined term discriminating unit 15 to appropriately extract a defined term from a plurality of terms in a document and may be any format including formats other than the above such as "hereinafter, called "???"" and "hereinafter, defined as "???"".

FIG. 3 is a conceptual diagram showing another example of defined term discrimination processing based on the first rule according to an embodiment. As shown in FIG. 3, the defined term discriminating unit 15 may extract a heading H (for example, "Article 2 (Definitions)") of one or a plurality of items 11 and 13 in the document D having a hierarchical structure. In this case, since "Article 2 (Definitions)" and the like that are terms for specifying a heading are stored in the dictionary database, the defined term discriminating unit 15 may refer to the terms stored in the dictionary database and specify the heading H of the item 13 that is assumed to include a defined term. When one or a plurality of terms included in the item 13 corresponding to the extracted heading H is expressed in a specific format ("(1) ???" or the like), the defined term discriminating unit 15 may discriminate the terms as defined terms DT1, DT3, and DT5. The specific format may need only enable the defined term discriminating unit 15 to appropriately extract a defined term from a plurality of terms in a document and may be any format. For example, in addition to the expression "(1) Employees and the like" in a first level in the document D, the specific format may include a format that straddles a plurality of levels such as a specific meaning "Executives and employees of the company and its affiliates . . . " of "(1) Employees and the like" described in a second level that is lower than the first level.

Returning to FIG. 1, with respect to the defined term discriminated by the defined term discriminating unit 15, the usage condition confirming unit 17 may confirm the usage condition of the defined term in the document based on a second rule.

The "second rule" may be, for example, a prescribed rule for confirming a usage condition of a defined term and, for example, includes the following rules.

(1) Although a defined term (for example, "present regulations" shown in FIGS. 2 and 3) is used in a document, whether or not a meaning of the defined term is defined (described) (a detailed description will be given in a first example of output information generation processing to be described later).

(2) Whether or not a defined term is used prior to a portion where a meaning of the defined term is defined in a document (a detailed description will be given in a second example of the output information generation processing to be described later).

(3) Although the meaning of a defined term is defined in a document, whether or not the defined term is not used even once at other locations in the document (a detailed description will be given in a third example of the output information generation processing to be described later).

(4) Whether or not a defined term is defined at a plurality of locations in a document (a detailed description will be given in a fourth example of the output information generation processing to be described later).

Note that the "first rule" and the "second rule" may be fixed or may be made appropriately changeable (settable) by the user.

The output information generating unit 19 may generate output information for outputting a confirmation result of the usage condition confirmed by the usage condition confirming unit 17.

For example, the recording unit 20 may record document information DI related to a document, defined term information DTI related to a defined term discriminated from the document by the defined term discriminating unit 15, rule information RI related to the "first rule" and the "second rule" respectively referred to by the defined term discriminating unit 15 and the usage condition confirming unit 17, usage condition information UCI related to a usage condition of the defined term confirmed by the usage condition confirming unit 17, and output information OI generated by the output information generating unit 19.

<Output Information Generation Processing>

An example of output information generation processing for generating output information for outputting a confirmation result of a usage condition of a defined term according to an embodiment will now be described with reference to FIGS. 4 to 12. First, the first example of the output information generation processing will be described with reference to FIGS. 4 and 5.

First Example

FIG. 4 is a flow chart showing an example of the output information generation processing of generating output information for outputting a confirmation result of a usage condition of a defined term according to an embodiment. As shown in FIG. 4, the defined term discriminating apparatus 1 shown in FIG. 1 may acquire document information DI related to a document D (step S1). The defined term discriminating apparatus 1 may discriminate a term included in the document D as a defined term DT based on the first rule (step S3). With respect to the discriminated defined term DT, the defined term discriminating apparatus 1 may confirm the usage condition of the defined term DT in the document D based on the second rule (step S5). The defined term discriminating apparatus 1 may generate output information OI for outputting a confirmation result of the usage condition (step S7). Based on the output information OI, for example, the defined term discriminating apparatus 1 may output a preview screen such as that shown in FIGS. 5 to 12 on an output unit (for example, an input/output interface 44 shown in FIG. 13).

Figure 5:
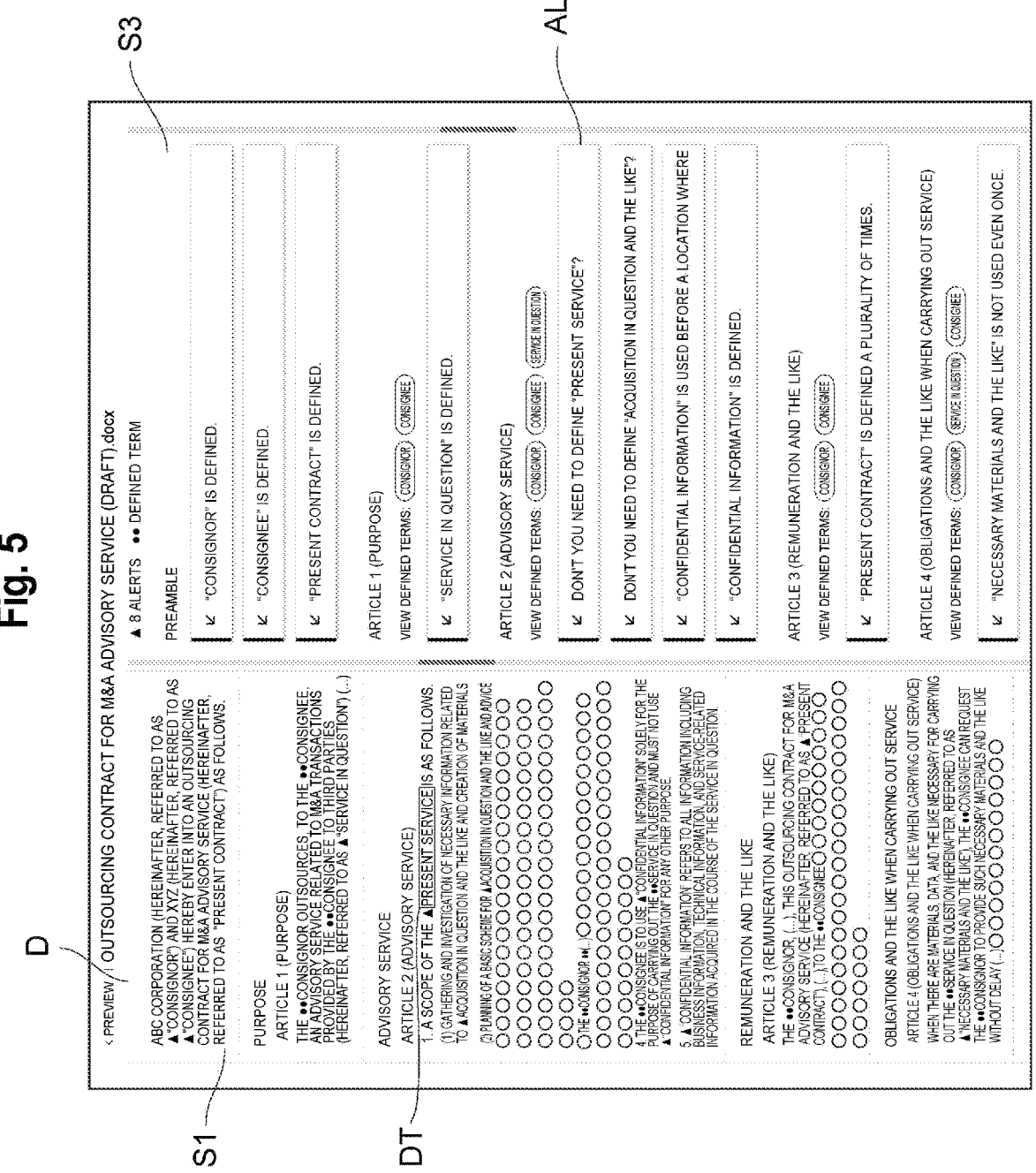
FIG. 5 is a diagram showing an output example of a confirmation result of a usage condition of a defined term according to an embodiment.

FIG. 5 is a diagram showing an example of the preview screen as the first example of the output information generation processing according to an embodiment. In the first example of the output information generation processing, the defined term discriminating apparatus 1 may generate output information for outputting a confirmation result of the usage condition of a defined term based on whether or not a specific meaning corresponding to the defined term is expressed in the document (second rule).

As shown in FIG. 5, for example, the preview screen may include a document screen (document area) S1 including contents of the document D and a confirmation result screen (confirmation result area) S3 including a confirmation result of the usage condition of defined terms. As shown in FIG. 5, the defined term discriminating apparatus 1 may confirm that, while the defined term DT (for example, "present service") is being used in the document D, a meaning of "present service" is not defined (described). In this case, the defined term discriminating apparatus 1 may generate output information for outputting a confirmation result screen S3 including an alert display AL that reads "Don't you need to define "present service"?" as a confirmation result of the usage condition of the defined term "present service" in the document D.

An output mode of a confirmation result of a usage condition of a defined term is arbitrary. While a preview screen on which the document screen (document area) S1 is arranged on a left side and the confirmation result screen (confirmation result area) S3 is arranged on a right side as shown in FIG. 5 has been described as an example of an output mode, output modes are not limited thereto. For example, arrangement positions of both screens S1 and S3 may be changed.

The defined term discriminating apparatus 1 according to the present embodiment may discriminate a defined term DT from a plurality of arbitrary terms in a document D, confirm the usage condition of the discriminated defined term in the document, and generate output information for outputting the confirmation result. Accordingly, a usage condition of a defined term in a document can be readily confirmed.

In particular, in the first example of the output information generation processing, the defined term discriminating apparatus 1 may generate output information for outputting a confirmation result of the usage condition of the defined term DT based on whether or not a specific meaning corresponding to the defined term DT is expressed in the document D. Therefore, the fact that a specific meaning corresponding to the defined term DT is not expressed in the document D can be readily comprehended.

Second Example

The second example of the output information generation processing will be described with reference to FIG. 6. In the second example of the output information generation processing, the defined term discriminating apparatus 1 generates output information for outputting a confirmation result of a usage condition of a defined term based on whether or not a specific meaning corresponding to the defined term is expressed at a position behind a position where the defined term is used in the document (second rule).

Figure 6:
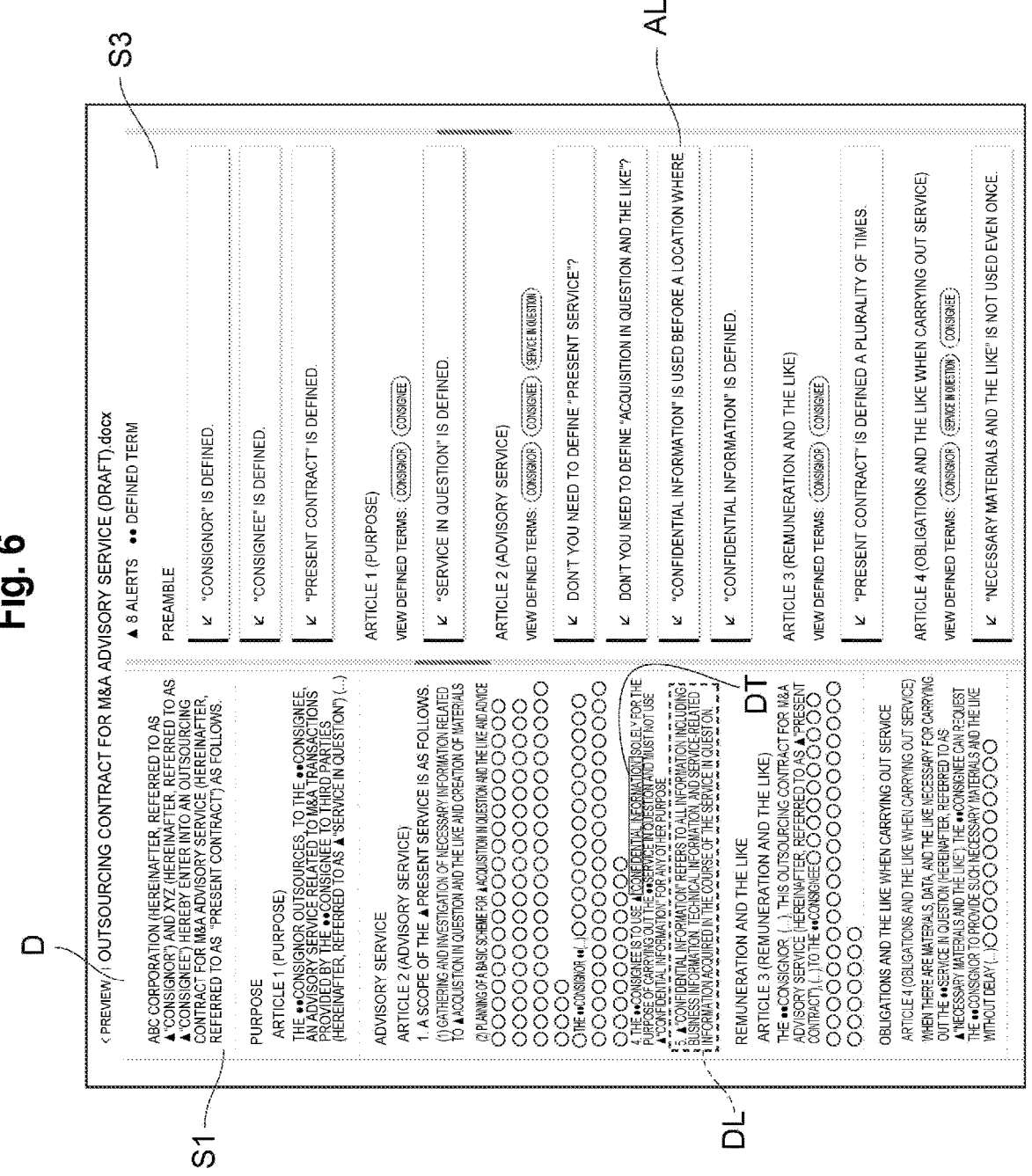
FIG. 6 is a diagram showing an output example of a confirmation result of a usage condition of a defined term according to an embodiment.

FIG. 6 is a diagram showing an example of a preview screen as the second example of the output information generation processing according to an embodiment. As shown in FIG. 6, the defined term discriminating apparatus 1 may confirm that a specific meaning (for example, "confidential information" refers to technical or business information to be disclosed to the other party for a certain purpose and . . . ) corresponding to a defined term "confidential information" is expressed at a position (a position enclosed by a dashed-line frame DL) behind a position where the defined term "confidential information" is being used in the document D. In this case, the defined term discriminating apparatus 1 may generate output information for outputting the confirmation result screen S3 including an alert display AL that reads ""Confidential information" is used before a location where "confidential information" is defined" as a confirmation result of the usage condition of the defined term "confidential information" in the document D.

In the second example of the output information generation processing, the defined term discriminating apparatus 1 may generate output information for outputting a confirmation result of a usage condition of a defined term DT based on whether or not a specific meaning corresponding to the defined term DT is expressed at a position behind a position where the defined term DT is used in the document D. Therefore, the fact that the defined term DT is used before a portion where the meaning of the defined term DT is defined in the document D can be readily comprehended.

Third Example

The third example of the output information generation processing will be described with reference to FIG. 7. In the third example of the output information generation processing, when a specific meaning corresponding to a term is expressed in a document, the defined term discriminating apparatus 1 may generate output information for outputting a confirmation result of a usage condition of a defined term based on whether or not a defined term corresponding to the term exists in the document (second rule).

Figure 7:
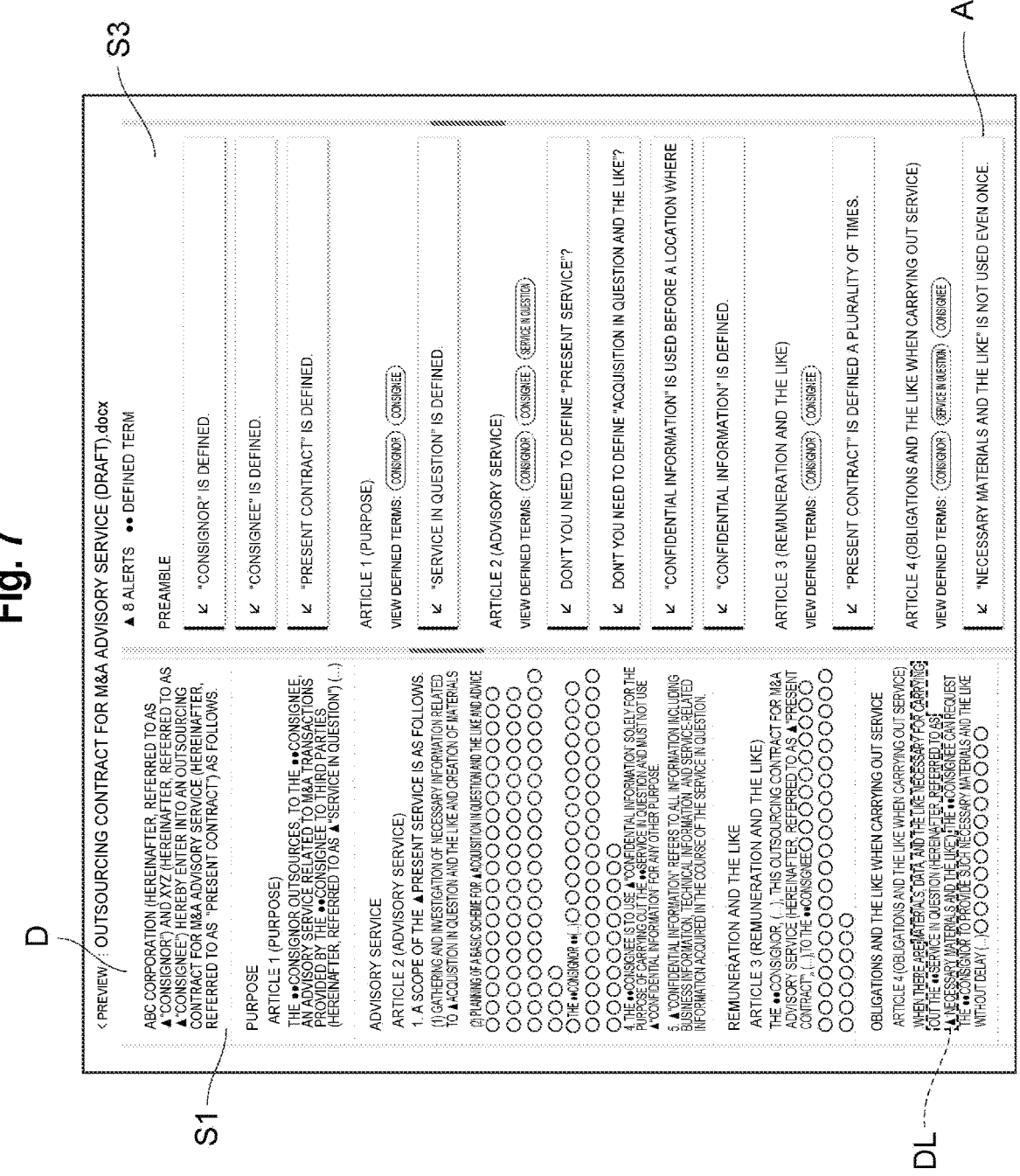
FIG. 7 is a diagram showing an output example of a confirmation result of a usage condition of a defined term according to an embodiment.

FIG. 7 is a diagram showing an example of a preview screen as the third example of the output information generation processing according to an embodiment. As shown in FIG. 7, as indicated by a dashed-line frame DL, the defined term discriminating apparatus 1 may confirm that while a meaning "materials, data, and the like necessary for carrying out the work in question" of a term "necessary materials and the like" is defined in the document D, the term "necessary materials and the like" is not used even once at other locations in the document D as a defined term. In this case, the defined term discriminating apparatus 1 may generate output information for outputting the confirmation result screen S3 including an alert display AL that reads ""Necessary materials and the like" is not used even once" as a confirmation result of the usage condition of the defined term "necessary materials and the like" in the document D.

In the third example of the output information generation processing, when a specific meaning corresponding to the term "necessary materials and the like" is expressed in the document D, the defined term discriminating apparatus 1 may generate output information for outputting a confirmation result based on whether or not the defined term "necessary materials and the like" corresponding to the term is present at locations other than the location of the expression in the document D. Therefore, the fact that while a meaning of a term is defined in the document D, the term is not used even once at other locations in the document D as a defined term can be readily comprehended.

Fourth Example

The fourth example of the output information generation processing will be described with reference to FIG. 8. In the fourth example of the output information generation processing, the defined term discriminating apparatus 1 may generate output information for outputting a confirmation result of a usage condition of a defined term based on whether or not a location where a specific meaning corresponding to the defined term is expressed in the document exists in plurality (second rule).

Figure 8:
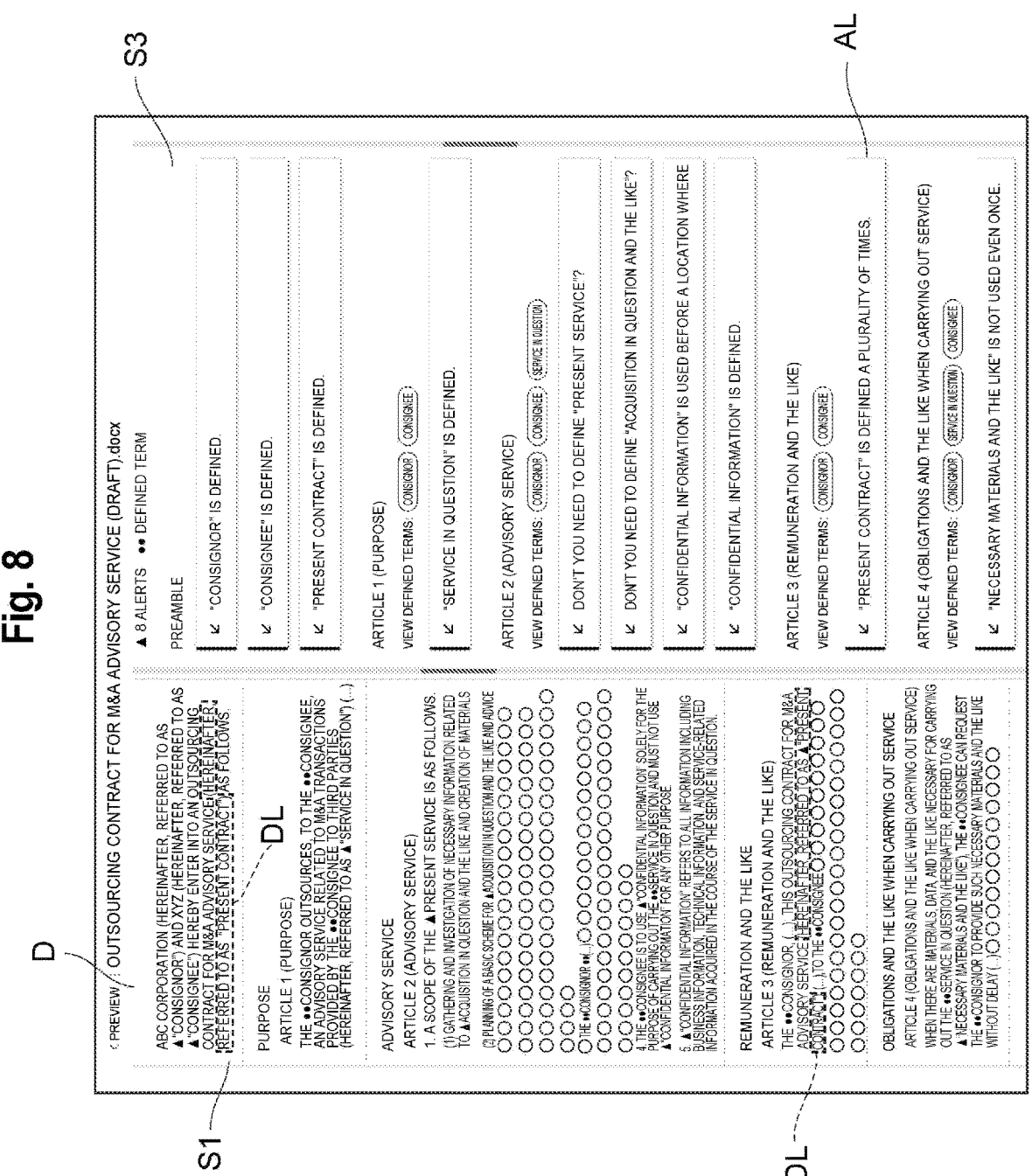
FIG. 8 is a diagram showing an output example of a confirmation result of a usage condition of a defined term according to an embodiment.

FIG. 8 is a diagram showing an example of a preview screen as the fourth example of the output information generation processing according to an embodiment. As shown in FIG. 8, the defined term discriminating apparatus 1 may confirm that the defined term "present contract" is defined at a plurality of locations as indicated by a dashed-line frame DL in the document D. In this case, the defined term discriminating apparatus 1 may generate output information for outputting the confirmation result screen S3 including an alert display AL that reads ""Present contract" is defined a plurality of times" as a confirmation result of the usage condition of the defined term "present contract" in the document D.

In the fourth example of the output information generation processing, the defined term discriminating apparatus 1 may generate output information for outputting a confirmation result based on whether or not a location where a specific meaning corresponding to the defined term is expressed in the document D exists in plurality. Therefore, the fact that a location where a specific meaning corresponding to the defined term is expressed in the document D exists in plurality can be readily comprehended.

Fifth Example

A fifth example of the output information generation processing will be described with reference to FIGS. 9 and 10. In the fifth example of the output information generation processing, when a confirmation result related to a specific defined term among a plurality of defined terms on the confirmation result screen on the preview screen is designated by the user, the defined term discriminating apparatus 1 may generate output information for outputting the document screen so as to specify a position where the specific defined term is being used.

Figure 9:
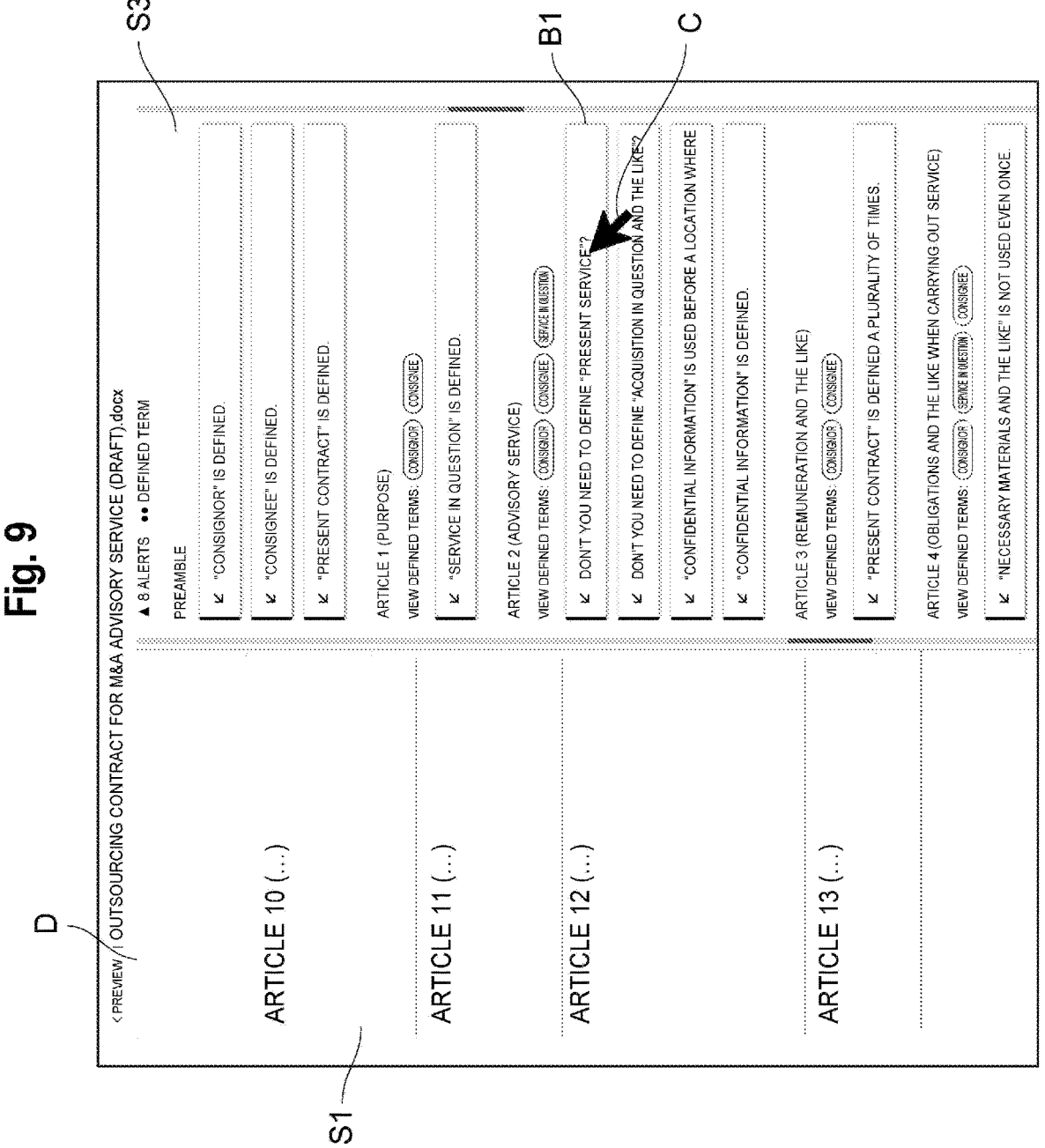
FIG. 9 is a diagram showing an output example of a confirmation result of a usage condition of a defined term according to an embodiment.
Figure 10:
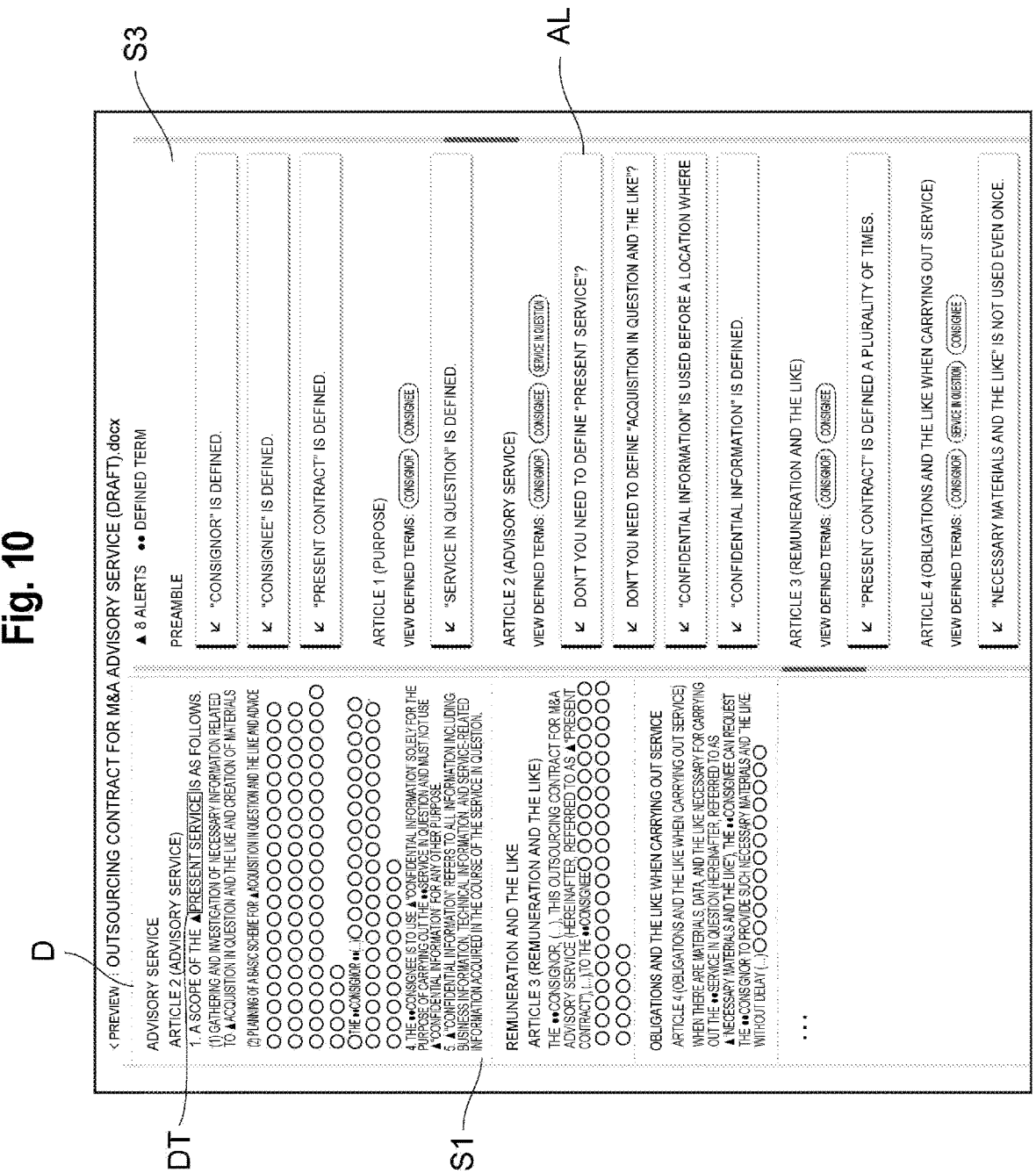
FIG. 10 is a diagram showing an output example of a confirmation result of a usage condition of a defined term according to an embodiment.

In a similar manner to FIG. 5, FIG. 9 is an example of a preview screen that is output when the defined term discriminating apparatus 1 confirms that, while the defined term DT (for example, "present service") is being used in the document D, a meaning of "present service" is not defined (described). FIG. 10 is an example of the preview screen that is output when the user performs a prescribed operation on the preview screen shown in FIG. 9.

As shown in FIG. 9, the user may operate a cursor C to designate (press) a specify button B1 corresponding to an alert display related to the specific defined term "present service" which reads "Don't you need to define "present service"?" on the confirmation result screen S3. As a result, as shown in FIG. 10, the defined term discriminating apparatus 1 may generate output information for outputting the document screen S1 so as to specify a position where the specific defined term DT "present service" is being used.

At this point, on the document screen S1 of the preview screen shown in FIG. 9, when the specify button B1 is designated in a state where Articles 10 to 13 in the document D are being displayed, the screen may be automatically scrolled. In addition, the document screen S1 of the preview screen shown in FIG. 10 may be output so that a description related to Article 2 which includes a position where the specific defined term DT "present service" is being used appears at the top. When the document screen S1 of the preview screen shown in FIG. 10 is output, the specific defined term DT "present service" may be highlighted. For example, highlighting may include the specific defined term DT "present service" being expressed in a different color, expressed in a different font, or expressed in a different size from other terms and defined terms.

In the fifth example of the output information generation processing, when a confirmation result related to a specific defined term among a plurality of defined terms on the confirmation result screen S3 is designated by the user, the defined term discriminating apparatus 1 may generate output information for outputting the document screen S1 so as to specify a position where the specific defined term is being used. Therefore, a defined term of which a meaning is to be described in the document D (a defined term for which the user is to perform correction work in the document D) can be readily comprehended.

Sixth Example

Figure 12:
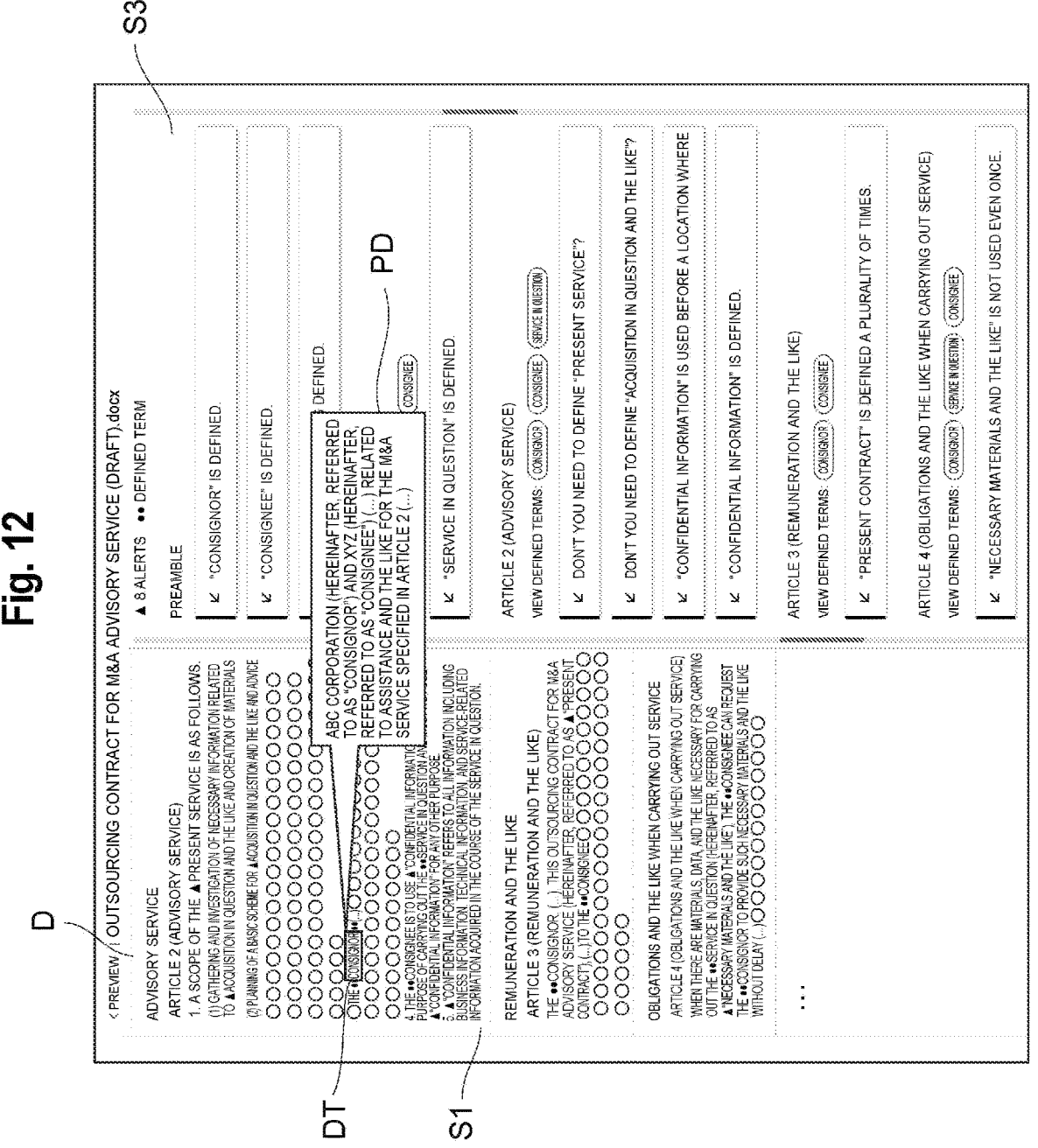
FIG. 12 is a diagram showing an output example of a confirmation result of a usage condition of a defined term according to an embodiment.

A sixth example of the output information generation processing will be described with reference to FIGS. 11 and 12. In the sixth example of the output information generation processing, when a confirmation result related to a specific defined term among a plurality of defined terms on the confirmation result screen on the preview screen is designated by the user, the defined term discriminating apparatus 1 may generate output information for outputting the document screen so as to specify a position where the specific defined term is being used and to display a specific meaning that corresponds to the specific defined term in association with the position.

FIG. 11 is an example of a preview screen that is similar to the preview screen shown in FIGS. 5 to 8. FIG. 12 is an example of the preview screen that is output when the user performs a prescribed operation on the preview screen shown in FIG. 11.

As is apparent from the description "View defined terms" in FIG. 11, for example, defined terms "consignor" and "consignee" may be discriminated from a description portion related to Article 2 (Advisory service) in the document D and, similarly, the defined terms "consignor" and "consignee" may be also discriminated from a description portion related to Article 3 (Remuneration and the like) in the document D. The user may operate the cursor C to designate (press) a specify button B3 corresponding to the specific defined term "consignor" on the confirmation result screen S3. As a result, as shown in FIG. 12, the defined term discriminating apparatus 1 may generate output information for outputting the document screen S1 so as to specify a position where the specific defined term DT "consignor" is being used (a position corresponding to the description portion of Article 2). When the user operates the cursor C to designate a specify button B5 that corresponds to the specific defined term DT "consignor" on the confirmation result screen S3, the defined term discriminating apparatus 1 may generate output information for outputting the document screen S1 so as to specify a position where the specific defined term "consignor" is being used (a position corresponding to the description portion of Article 3).

On the document screen S1 of the preview screen shown in FIG. 11, when the specific button B3 is designated in a state where Articles 31 to 34 in the document D are being displayed, the screen may be automatically scrolled. In addition, the document screen S1 of the preview screen shown in FIG. 12 may be output so that a description related to Article 2 which includes a position where the specific defined term DT "consignor" is being used appears at the top. Furthermore, on the preview screen shown in FIG. 12, for example, when the user designates a specific defined term DT (executes a so-called mouseover or the like) on the document screen S1 with the cursor C being operated by the user himself/herself, a specific meaning corresponding to "consignor" may be displayed by a pop-up (PD) in association with a position where the specific defined term DT "consignor" is being used.

In the sixth example of the output information generation processing, when a confirmation result related to a specific defined term among a plurality of defined terms on the confirmation result screen S3 is designated by the user, the defined term discriminating apparatus 1 may generate output information for outputting the document screen S1 so as to specify a position where the specific defined term is being used and to display a specific meaning that corresponds to the specific defined term in association with the position. Therefore, a specific meaning corresponding to a defined term desired by the user can be readily comprehended.

Figure 13:
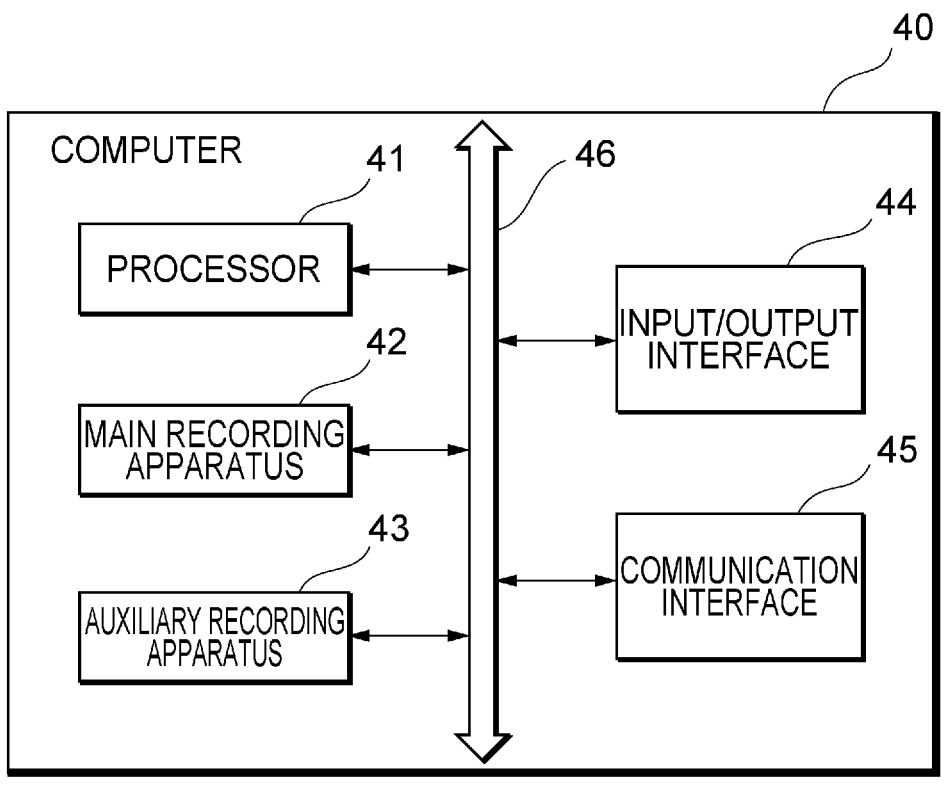
FIG. 13 is a diagram showing an example of a hardware configuration of a computer according to an embodiment.

FIG. 13 is a diagram showing an example of a hardware configuration of a computer according to an embodiment. An example of a hardware configuration of a computer that can be used to construct the defined term discriminating apparatus 1 shown in FIG. 1 will now be described with reference to FIG. 13.

As shown in FIG. 13, a computer 40 mainly includes a processor 41, a main recording apparatus 42, an auxiliary recording apparatus 43, the input/output interface 44, and a communication interface 45 as hardware resources and the hardware resources are connected to each other via a bus line 46 including an address bus, a data bus, and a control bus. Note that an interface circuit (not shown) may be interposed between the bus line 46 and each hardware resource.

The processor 41 may control the entire computer. For example, the processor 41 may correspond to the information processing unit 11 of the defined term discriminating apparatus 1 shown in FIG. 1. The main recording apparatus 42 may be a volatile memory such as a SRAM (Static Random Access Memory) or a DRAM (Dynamic Random Access Memory) which provides the processor 41 with a work area. The auxiliary recording apparatus 43 may be a nonvolatile memory such as an HDD, an SSD, or a flash memory which stores programs and other software, data, and the like. The programs, data, and the like may be loaded from the auxiliary recording apparatus 43 to the main recording apparatus 42 via the bus line 46 at an arbitrary timing. For example, the auxiliary recording apparatus 43 may correspond to the recording unit 20 of the defined term discriminating apparatus 1 shown in FIG. 1.

The input/output interface 44 may be a camera, a keyboard, a mouse, a display, a touch panel display, a microphone, a speaker, or the like which performs one of or both of outputting or presenting information (such as outputting prescribed screens based on output information generated by the output information generating unit 19 shown in FIG. 1) and receiving input of information. The communication interface 45 may be for transmitting and receiving various types of data to and from an external apparatus or an external database via a prescribed communication network. The communication interface 45 and the prescribed communication network may be connected to each other in a wired or wireless manner. The communication interface 45 may also acquire information related to the network such as information related to a Wi-Fi access point or information related to a base station of a communication carrier.

It will be obvious to a person skilled in the art that, due to cooperation between the hardware resources exemplified above and software, the computer 40 may function as desired means, executes desired steps, and realizes desired functions.

Each of the embodiments described above is presented in order to facilitate understanding of the present invention and is not intended to limit the interpretation of the present invention. The present invention may be modified or improved without departing from the spirit and scope thereof and is intended to cover all equivalents thereof. Furthermore, the present invention can form various disclosures by appropriately combining a plurality of components disclosed in the respective embodiments described above. For example, several components may be deleted from all components described in the embodiments. In addition, components may be appropriately combined with a different embodiment.

What is claimed is:

1. An information processing apparatus, comprising:
   a discriminating unit configured to discriminate a term included in a document as a defined term that is defined as a term with a specific meaning based on a first rule;
   a confirming unit configured to confirm a usage condition of the discriminated defined term in the document; and a generating unit configured to generate output information for outputting a confirmation result of the usage condition, wherein the generating unit is configured to generate output information for outputting the confirmation result based on whether or not a specific meaning corresponding to the defined term is expressed in the document, and the generating unit is configured to generate output information for outputting the confirmation result based on whether or not the specific meaning corresponding to the defined term is expressed at a position behind a position where the defined term is being used in the document.

2. The information processing apparatus according to claim 1, wherein when the term is expressed in a specific format, the discriminating unit is configured to discriminate the term as the defined term.

3. The information processing apparatus according to claim 1, wherein the discriminating unit is configured to extract headings of one or a plurality of items in the document having a hierarchical structure, and when the term included in the item corresponding to the extracted heading is expressed in a specific format, the discriminating unit is configured to discriminate the term as the defined term.

4. The information processing apparatus according to claim 1, wherein when the specific meaning corresponding to the term is expressed in the document, the generating unit is configured to generate output information for outputting the confirmation result based on whether or not the defined term corresponding to the term exists in the document.

5. The information processing apparatus according to claim 1, wherein the generating unit is configured to generate output information for outputting the confirmation result based on whether or not a location where the specific meaning corresponding to the defined term is expressed in the document exists in plurality.

6. The information processing apparatus according to claim 1, wherein the generating unit is configured to generate output information for outputting a document screen including the document in an output mode in accordance with a user operation on a confirmation result screen including the confirmation result.

7. The information processing apparatus according to claim 6, wherein when the confirmation result related to a specific defined term among a plurality of the defined terms on the confirmation result screen is designated by the user, the generating unit is configured to generate output information for outputting the document screen so as to specify a position where the specific defined term is being used.

8. The information processing apparatus according to claim 6, wherein when the confirmation result related to the specific defined term among a plurality of the defined terms on the confirmation result screen is designated by the user, the generating unit is configured to generate output information for outputting the document screen so as to specify a position where the specific defined term is being used and to display a specific meaning corresponding to the specific defined term in association with the position.

9. An information processing method in which a computer executes the steps of:

discriminating a term included in a document as a defined term that is defined as a term with a specific meaning based on a first rule;

confirming a usage condition of the discriminated defined term in the document; and generating output information for outputting a confirmation result of the usage condition, wherein the outputting information for outputting the confirmation result is based on whether or not a specific meaning corresponding to the defined term is expressed in the document, and the generating step generates output information for outputting the confirmation result based on whether or not the specific meaning corresponding to the defined term is expressed at a position behind a position where the defined term is being used in the document.

10. The information processing method according to claim 9, wherein when the term is expressed in a specific format, the discriminating step discriminates the term as the defined term.

11. The information processing method according to claim 9, wherein the discriminating step extracts headings of one or a plurality of items in the document having a hierarchical structure, and when the term included in the item corresponding to the extracted heading is expressed in a specific format, the discriminating step discriminates the term as the defined term.

12. The information processing method according to claim 9, wherein the specific meaning corresponding to the term is expressed in the document, generating step generates output information for outputting the confirmation result based on whether or not the defined term corresponding to the term exists in the document.

13. The information processing method according to claim 9, wherein the generating step generates output information for outputting the confirmation result based on whether or not a location where the specific meaning corresponding to the defined term is expressed in the document exists in plurality.

14. The information processing method according to claim 9, wherein the generating step generates output information for outputting a document screen including the document in an output mode in accordance with a user operation on a confirmation result screen including the confirmation result.

15. The information processing method according to claim 14, wherein when the confirmation result related to a specific defined term among a plurality of the defined terms on the confirmation result screen is designated by the user, the generating step generates output information for outputting the document screen so as to specify a position where the specific defined term is being used and to display a specific meaning corresponding to the specific defined term in association with the position.

*   *   *   *   *